United States Patent
Mittal et al.

(10) Patent No.: US 7,801,867 B2
(45) Date of Patent: Sep. 21, 2010

(54) OPTIMIZING BACKUP AND RECOVERY UTILIZING CHANGE TRACKING

(75) Inventors: Harshwardhan Mittal, Hyderabad (IN); Kushal Suresh Narkhede, Hyderabad (IN)

(73) Assignee: Microsoft Corporation, Redmond, WA (US)

( * ) Notice: Subject to any disclaimer, the term of this patent is extended or adjusted under 35 U.S.C. 154(b) by 158 days.

(21) Appl. No.: 11/616,690

(22) Filed: Dec. 27, 2006

(65) Prior Publication Data

US 2008/0162600 A1  Jul. 3, 2008

(51) Int. Cl.
*G06F 17/00* (2006.01)
(52) U.S. Cl. ................ 707/686; 711/162
(58) Field of Classification Search .......... None
See application file for complete search history.

(56) References Cited

U.S. PATENT DOCUMENTS

| | | | |
|---|---|---|---|
| 5,933,838 | A | 8/1999 | Lomet |
| 6,687,897 | B2 | 2/2004 | Guinart |
| 6,742,138 | B1 | 5/2004 | Gagne et al. |
| 6,920,555 | B1 | 7/2005 | Peters et al. |
| 6,978,279 | B1 | 12/2005 | Lomet et al. |
| 6,993,523 | B1 | 1/2006 | Mende, Jr. |
| 7,107,589 | B1 | 9/2006 | Tal et al. |
| 2004/0199552 | A1 | 10/2004 | Ward et al. |
| 2005/0033777 | A1 | 2/2005 | Moraes et al. |
| 2005/0149582 | A1 | 7/2005 | Wissmann et al. |
| 2005/0204108 | A1* | 9/2005 | Ofek et al. ................ 711/162 |
| 2005/0262097 | A1 | 11/2005 | Sim-Tang et al. |
| 2006/0020634 | A1 | 1/2006 | Huras et al. |
| 2006/0047715 | A1 | 3/2006 | Parizeau |
| 2006/0085485 | A1 | 4/2006 | Shimshoni |
| 2006/0122964 | A1 | 6/2006 | Yu et al. |
| 2006/0129769 | A1 | 6/2006 | Chen et al. |
| 2006/0136471 | A1 | 6/2006 | Ge et al. |
| 2006/0235899 | A1 | 10/2006 | Tucker |
| 2007/0079089 | A1* | 4/2007 | Ohran et al. ................ 711/162 |
| 2007/0079140 | A1 | 4/2007 | Metzger et al. |
| 2007/0083794 | A1* | 4/2007 | Yu ................ 714/38 |
| 2007/0112895 | A1* | 5/2007 | Ahrens et al. ................ 707/204 |
| 2007/0294577 | A1 | 12/2007 | Fiske |
| 2007/0294703 | A1 | 12/2007 | Talu et al. |

OTHER PUBLICATIONS

Bertucci et al., "What's New in SQL Server 2000—Second Edition," Feb. 14, 2003, 4 pages, Sams Publishing, USA.

Cooksey et al., "TALX: Increased Performance with RMAN and Oracle Database 10g," Oct. 2005, 4 pages, Oracle Corporation, USA.

(Continued)

*Primary Examiner*—Etienne P LeRoux
*Assistant Examiner*—Anteneh Girma
(74) *Attorney, Agent, or Firm*—Senniger Powers LLP

(57) ABSTRACT

Application data associated with an application program located on a storage device is restored utilizing tracked changed blocks of the storage device. The changed blocks of the storage device are tracked as the application program modifies the application data. When a system failure has occurred, file change data is generated for each file of the application data as a function of tracked changed blocks of the storage device and file system metadata of the storage device. Additionally, a file difference record for each changed file is generated to indicate changes between the application data and the last backup. The file difference record is applied to the application data such that application data corresponds to the state of last backup.

14 Claims, 5 Drawing Sheets

OTHER PUBLICATIONS

Bednar, "Oracle Recovery Manager 10g," Nov. 2003, 14 pages, Oracle Corporation, USA.

Unknown, "Database Recovery Process with Examples," 14 pages, Oct. 2006, IBM, USA.

* cited by examiner

OPTIMIZING BACKUP AND RECOVERY UTILIZING CHANGE TRACKING

BACKGROUND

Data protection and restoration is a critical component of any business enterprise. Typically, the time a recovery program needs to recover data from a backup is proportional to the size of the data source. Recovery time is important to a business, because the application is not functional during recovery.

The recovery process starts when a user detects an anomaly in an application behavior due to a system failure. For example, the application may be unavailable or some important data (e.g. a critical SQL table) is missing. Once an administrator is notified, a recovery process is initiated. In general, the recovery process can be broken down in three phases: (1) preserving the state of the application data after the system failure and before restoring the data; (2) recovering the application data from a backup; and (3) setting up backup protection post recovery. For example, if the total size of protected application data is X, the whole process involves 3X amount of data transfer (1X of data is transferred to preserving the state of the application data after the system failure and before restoring the data, 1X of data is transferred to recover the application data from a backup, and 1X of data is transferred to create the first backup point). Even with modern hardware and a moderate size of data, the whole process takes significant time (hours).

In some cases, administrators will skip the first step to reduce recovery time and overwrite the existing application data without performing a backup. However, it desirable to backup the current state of the application data to an alternate location. This allows the administrator to recover data in case the recovery process fails or the preserved data may be analyzed to determine the cause of the system failure. In some cases, the administrator may be able to salvage additional data from the preserved data which could not be recovered from a previous backup of the application data.

Additionally, there are three distinct states of the application data during the recovery process: (1) the state of the data on the protected server prior to the recovery (PD1), (2) the state of the data on backup server corresponding to the recovery point chosen (BD), and (3) the state of the data on protected server after recovery (PD2). In prior art recovery systems, no application agnostic process is used to transition from one state to another.

SUMMARY

Embodiments of the invention overcome one or more deficiencies in known recovery programs by transferring only the data that has changed since the last backup from the backup server to the application server. The application server tracks changes to a storage device associated with the application data to allow the backup server to transfer only the changes from the last backup to the application server.

In another aspect, the application server generates changes to the application data utilizing the tracked changes to the storage device. The application server transfers the changed data to the backup server allowing the backup server to preserve the current state of the application data. This data may be used to create a new recovery point (replica) or to preserve the current state of the application data after a system failure. Alternatively, embodiments of the invention may comprise various other methods and apparatuses.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
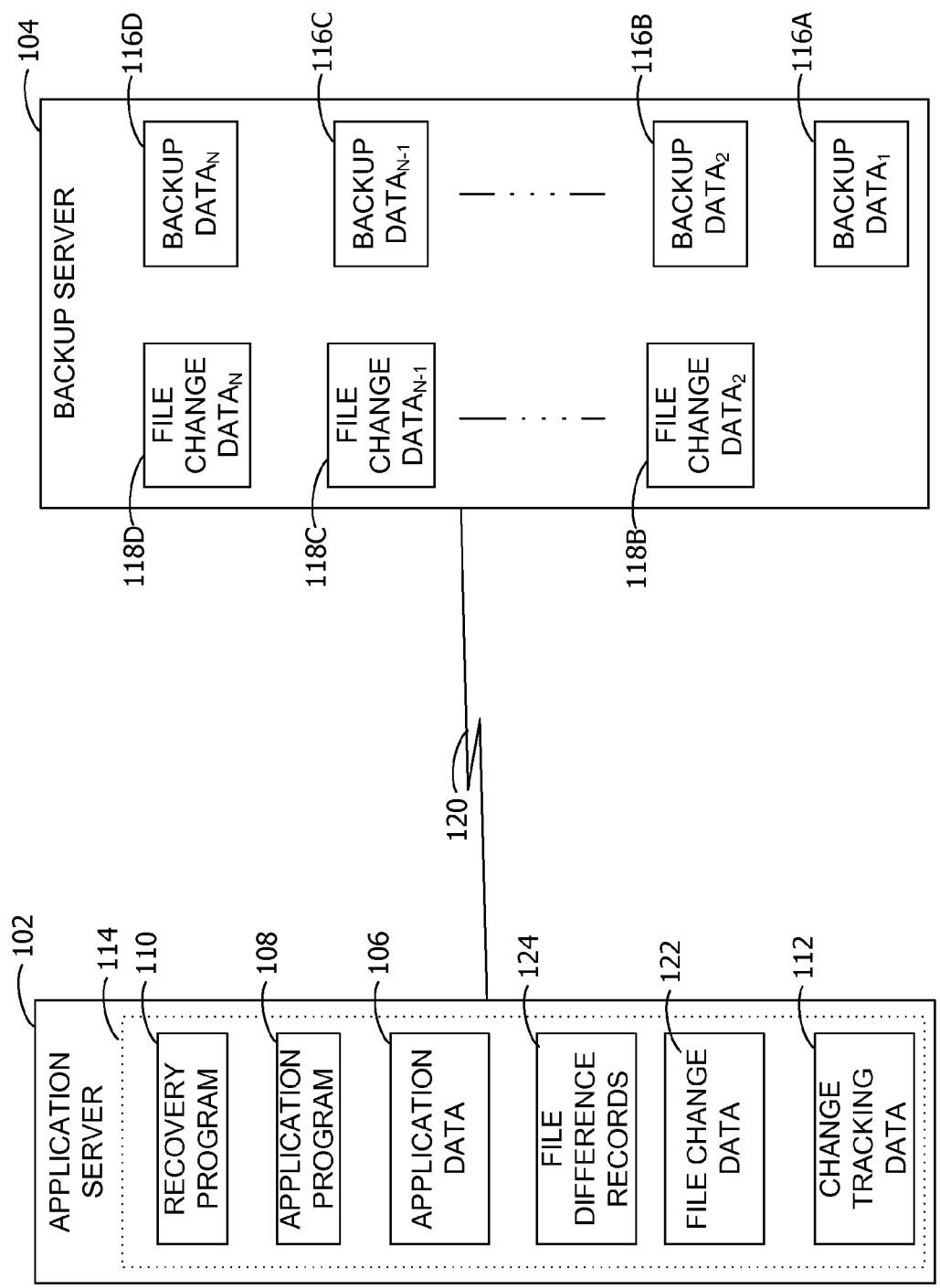
FIG. 1 is an exemplary block diagram illustrating a system for recovering application data according to an embodiment of the invention.

Referring now to the drawings, an embodiment of the invention includes an application server 102 and a backup server 104. The application server 102 includes a application data 106 modified by an application program 108 and protected by the recovery program 110. The application data 106 is associated with one or more application programs such as an email application or database application and is contained on one or more storage devices 114.

FIG. 1 shows one example of a general purpose computing device in the form of application server 102 and backup server 104. In one embodiment of the invention, the computer (e.g. application server 102 and backup server 104) is suitable for use in the other figures illustrated and described herein. The computer (e.g. application server 102 and backup server 104) has one or more processors or processing units and a system memory. The computer (e.g. application server 102 and backup server 104) typically has at least some form of computer readable media. Computer readable media, which include both volatile and nonvolatile media, removable and non-removable media, may be any available medium that may be accessed by the computer (e.g. application server 102 and backup server 104). By way of example and not limitation, computer readable media comprise computer storage media and communication media.

Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by the computer (e.g. application server 102 and backup server 104).

Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of any of the above are also included within the scope of computer readable media.

The recovery program 110 tracks the changes to the storage device 114 throughout the duration of protection of the application data 106. In one embodiment, the recovery program 110 monitors writes to the volume of the storage device 114 and maintains the change tracking data 112. Alternatively, the recovery program 110 monitors writes to the file system of the storage device 114 and maintains the change tracking data 112. The change tracking data 112 includes metadata about the writes to each protected volume or file system of the storage device 114 since the last backup (backup data$_N$ 116D). The change tracking data 112 does not include the actual data written to the volume or file system, only an indication of the blocks of the volume or file system that have been written since the last backup (backup data$_N$ 116D).

The application server 102 and backup server 104 may also include other removable/non-removable, volatile/nonvolatile computer storage media such as the storage device 114. Removable/non-removable, volatile/nonvolatile computer storage media that may be used in the exemplary operating environment include, but are not limited to, magnetic disk drive, optical disk drive, magnetic tape cassettes, flash memory cards, digital versatile disks, digital video tape, solid state RAM, solid state ROM, and the like. The drives or other mass storage devices and their associated computer storage media discussed above and illustrated in FIG. 1, provide storage of computer readable instructions, data structures, program modules and other data for the application server 102 and backup server 104. In FIG. 1, for example, storage device 114 is illustrated as application data 106, application program 108, recovery program 110 and change tracking data 112.

The backup server 104 includes backup data 116A, 116B, 116C, 116D (replicas of the application data) and file change data 118A, 118B, 118C, 118D. The backup data 116A, 116B, 116C, 116D is a copy of the application data 106 for a particular point in time and corresponds to a recovery point. Also, each copy of the backup data 116A, 116B, 116C, 116D is associated with file change data 118A, 118B, 118C, 118D file. For example, backup data$_N$ 116D and file change data$_N$ 118D correspond to an nth recovery point while backup data$_2$ 116B and file change data$_2$ 118B correspond to a second recovery point.

The file change data 118A, 118B, 118C, 118D indicates the changes to the application data 106 between any two recovery points. For example, referring to FIG. 1, file change data 118C indicates the changes to the application data 106 that occurred between backup data 116B and backup data 116C. In one embodiment, the file change data 118A, 118B, 118C, 118D does not include the actual data written to the application data 106, but instead includes an indication of the blocks that have been written between two consecutive recovery points.

In an embodiment, the application server 102 communicates with the backup server 104 through a logical communication connection 120. The application server 102 and backup server 104 may operate in a networked environment using the logical communication connection 120. The logical communication connection 120 depicted in FIG. 1 include a local area network (LAN) and a wide area network (WAN), but may also includes other networks. LAN and/or WAN may be a wired network, a wireless network, a combination thereof, and so on. Such networking environments are commonplace in offices, enterprise-wide computer networks, intranets, and global computer networks (e.g., the Internet).

In a networked environment, program modules depicted relative to the application server 102 and backup server 104, or portions thereof, may be stored in a remote memory storage device (not shown). The network connections shown are exemplary and other means of establishing a communications link between the computers may be used.

Figure 2:
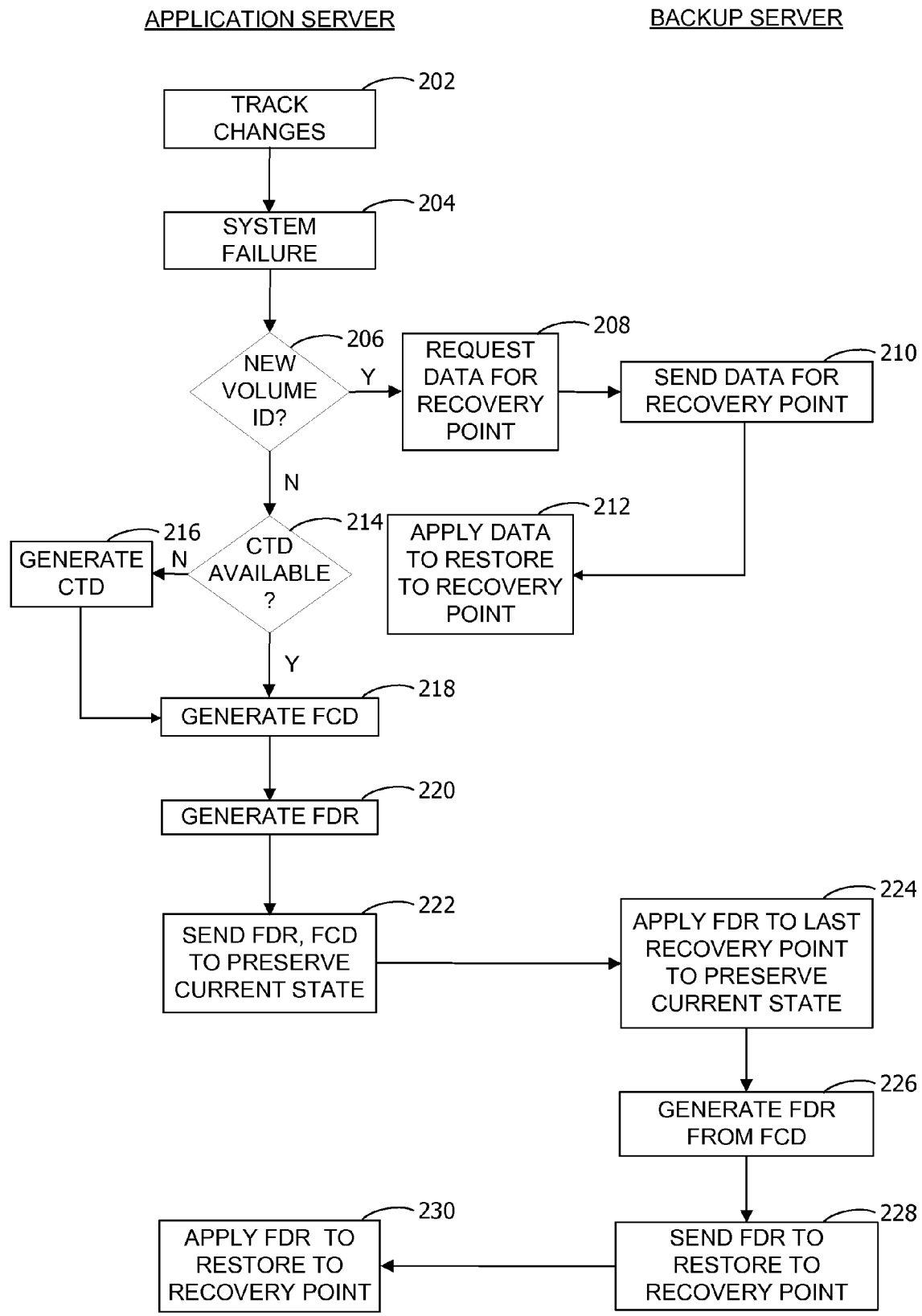
FIG. 2 is an exemplary flow chart embodying aspects of the invention for preserving and recovering application data according to an embodiment of the invention.

FIG. 2 is a flow diagram for restoring the application data 106 of the application program 108 according to the system illustrated in FIG. 1. At 202, the recovery program 110 initiates change tracking generating change tracking data 112. In one embodiment, the change tracking data 112 is written to a data structure of the memory of the application server 102. In this embodiment, the change tracking data 112 does not include the actual data written to the storage device, only an indication of the blocks of the storage device that have been written since the last backup (backup data$_N$ 116D). Advantageously, because the actual changed data is not written to the change tracking data 112, the recovery program 112 minimizes the use of system resources.

At 204, a system failure related to the application program 108 is detected. For example, the application program 108 may be completely or partially unavailable or some important data (e.g. a SQL table) is missing. After the system failure is detected, the recovery process is initiated by determining the type of system failure at steps 206 and 214.

Generally, system failures may be classified into the following three categories: corruption, crash, and disaster. Corruption is a logical corruption of the application data 106 and includes transient hardware errors, bit flips, and the accidental deletion of data by users. In this case, the storage device 114 of the application server 102 (including the change tracking data 112) is intact and the operating system is executing normally. A crash results when the application server 102 has crashed or unexpectedly shutdown which results in unmanaged reboot of the operating system. In this case, the application data 106 and/or the change tracking data 112 may be corrupted, but the storage device 114 is in a healthy state. The last category, disaster, occurs when the storage device 114 of the application server 102 has failed and has been replaced.

At 206, a check is made to determine if the storage device 114 has been replaced. If so, the type of system failure is a disaster and a request for the backup data (e.g. backup data 116A, 116B, 116C, 116D) associated with one recovery point is made to the backup server 104 at 208. In an embodiment, the volume identifier of the storage device 114 is checked to see if it has changed since the last backup (e.g. backup data$_N$ 116D). If so, the storage device 114 has been replaced. Alternatively, it may be determined if the storage device has been replaced by checking a unique signature of the storage device, administrator input to the recovery program, or by checking a RFID tag associated with the storage device. At 210, the backup server 104 transfers the backup data (e.g. backup data 116A, 116B, 116C, 116D) corresponding to the requested recovery point to the application server 102. For example, backup data 116A is associated with a first recovery point, backup data 116D is associated with an nth recovery point, and backup data 116C is associated with a n−1 recovery point. At 212, the backup data 116A, 116B, 116C, 116D associated with the requested recovery point is applied to the application data 106 to complete the recovery of the application data 106.

If it is determined that the storage device has not been replaced at 206, a check is made to see if the change tracking data (CTD) 112 is available on the application server 102 at 214. In an embodiment, the recovery program marks the storage device 114 as dirty to indicate that a clean shutdown has not occurred when change tracking is initiated at 202. At the time of a clean shutdown, the storage device 114 is marked as clean to indicate that the change tracking data 112 is available and that a clean shut down has occurred. If the recovery program detects that the storage device 114 has a dirty status, a crash type system failure has occurred and the change tracking data 112 should not be used.

If the change tracking data 112 is available, a corruption type system failure has occurred and the process continues at 218. If the change tracking data is not available, a crash type system failure has occurred and the change tracking data 112 needs to be generated at 216. In an embodiment, the change tracking data 112 is generated by comparing a checksum for the application data 106 to a checksum for the last backup, backup data$_N$ 116D. The checksum is compared on a block by block basis. For example, if the checksum for the application data 106 is different that the checksum for a block of backup data$_N$ 116D, the block has been changed and indication is written to the change tracking data 112

At 218, file change data (FCD) 122 is generated for each file of the application data 106 as a function of the file system and the application data 106. The file change data 122 indicates the blocks of application data 106 that have changed since the last backup, backup data$_N$ 116D. In one embodiment, the application indicates the files belonging to the application, while file system of storage device indicates which blocks on the storage device belong to each file, thus it is possible to determine which the blocks belonging to the application data. The intersection of the application data blocks with the change tracking data determines changed blocks for application data 106 since last backup.

Examples of file systems include FAT (File Allocation Table), NTFS (New Technology File System), HFS (Hierarchical File System), HFS+ (Hierarchical File System Plus), ext2 (second extended file system) and ext3 (third extended file system). Therefore, it is possible to determine which blocks belong to the application data 106 as a function of the application data 106 and the file system of the storage device 114. Furthermore, the change tracking data 112 indicates the blocks of the storage that have changed since the last backup. Therefore, it is possible to generate file change data 122 (the blocks of the files of the application data that have changed since the last backup) as a function of the change tracking data 112 and the determined blocks belonging to the application data 106.

At 220, a first file difference record 124 (FDR) is generated as a function of the application data 106 and the file change data. The first file difference record 124 is used to by the backup server 104 to construct a copy of the current state of the application data 106 (PD1). In an embodiment, the first file difference record 124 data structure contains data changed between PD1 and last backup (e.g. backup data$_N$ 116D). It is possible to construct the second version of PD1 by applying the first file difference record 124 to the last backup (e.g. backup data$_N$ 116D).

At 222, the first file difference record 124 and the file change data 122 for each file of the application data 106 are sent to the backup server 104. At 224, the backup server 104 applies the first file difference record 124 to the last backup (e.g. backup data$_N$ 116D) to create a new version of the application data 106 to preserve the current state of the application data 106 (PD1) before attempting a recovery. The first file difference record 124 can be kept on the application server 102 for duration of recovery and discarded on the successful completion of the recovery procedure. Furthermore, the size of the first file difference record 124 is only a fraction of the size of whole PD1. Advantageously, this optimization reduces time taken for backup and consumes a fraction of disk space consumed by PD1.

The PD1 data may be preferred to a previous recovery point in case the backup application fails to recover the desired recovery point during the recovery procedure. The PD1 data may also be used for doing analysis of what went wrong or to salvage additional data which could not be recovered by the recovery program 110. Some administrators skip this step to reduce recovery time and overwrite the application data 106, but this can be disastrous if recovery from the backup fails. Advantageously, because only the changed data represented by the first file difference record 124 is transferred from the application server 102 to the backup server 104, the time to perform this preservation step is minimized. Alternatively, step 224 can be executed post recovery (after step 228) to save application downtime.

At 226, the backup server 104 generates a second file difference record 124 as a function of the last backup data (e.g. backup data$_N$ 116D) and the file change data. The second file difference record 124 is the data applied to the application data 106 to restore that data so it is consistent with the backup data. At 228, the second file difference record 124 is transferred to the application server 102. The size of the second file difference record 124 is only a fraction of the size of whole last backup. Advantageously, this optimization reduces time taken for backup and consumes a fraction of disk space consumed by last backup (e.g. backup data$_N$ 116D).

At 230, the application server 102 applies the second file difference record 124 to the application data 106 to recover the data and make the application data 106 consistent with the last backup. Because only the changed data represented by the second file difference record 124 is transferred from the application server 102 to the backup server 104, the time, space and bandwidth requirements for recovery may be reduced by a large factor (see Appendix A). Advantageously, reduction in recovery time reduces the downtime for the application and improves business efficiency.

After recovery, protection needs to be setup again to protect against future system failures. This step is done after the application is online, so it is not part of the recovery downtime, but it is the part of overall recovery process. Because the backup server already has a copy of the backup data associated with the recovery point and all changes to the application data are tracked after recovery, it is not necessary to perform a full backup to restart the protection process. Furthermore, this optimization is independent of type of failure. The next express backup can be achieved by synchronizing the first recovery point post system failure to the backup data recovered. Then, the change tracking data is used by the application server to generate the file change data and file difference records. The file change data and file difference records are transferred to the backup server. Next, the backup server then applies the file difference records the backup data to generate the next recovery point after the system failure. Advantageously, the need of doing complete full backup after performing system recovery is eliminated and the time and network bandwidth requirements for recovery is reduced.

Figure 3:
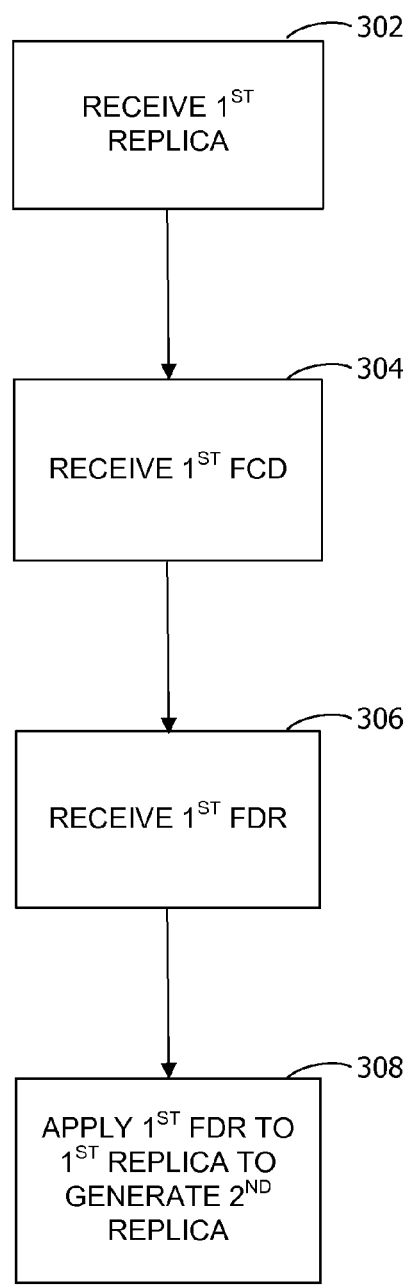
FIG. 3 is a flow diagram for creating an express backup according to an embodiment of the invention.

FIG. 3 is a flow diagram for creating an express backup according to an embodiment of the invention. At 302, the protection of the application data is initiated when the backup server 104 receives a first replica or backup data (e.g. backup data$_1$) from the application server 102. The first replica is a copy of the application data 106 at some initial recovery point. At 304, backup server 104 receives a first file change data (e.g. file change data 122) from the application server 102. The first file change data indicates the blocks of application data 106 that have changed since the last backup.

At 306, the backup server 104 receives a first file difference record (e.g. file difference record 124) from the application server 102. The first file difference record is generated as a function of the application data 106 and the file change data. In an embodiment, the first file difference record data structure contains data changed since the time of the last backup (e.g. backup data$_N$ 116D). At 308, the backup server 104 applies the first file difference record to the first replica to generate a second replica of the application data 106 for a second recovery point.

Advantageously, bandwidth and disk space to create the express backup is minimized because only the file difference record and file change data is transferred from the application server 102 to the backup server 104 to create the second replica. Additionally, after the file difference records have been applied to the first replica, the file difference records may be deleted. However, the file change data is kept on the application server for recovery purposes as explained above with respect to FIG. 2. Additionally, the time needed to recover the application data 106 will be proportional to the time difference between backup and recovery, which can be reduced to desired extent by increasing the frequency of the express backups.

Figure 4:
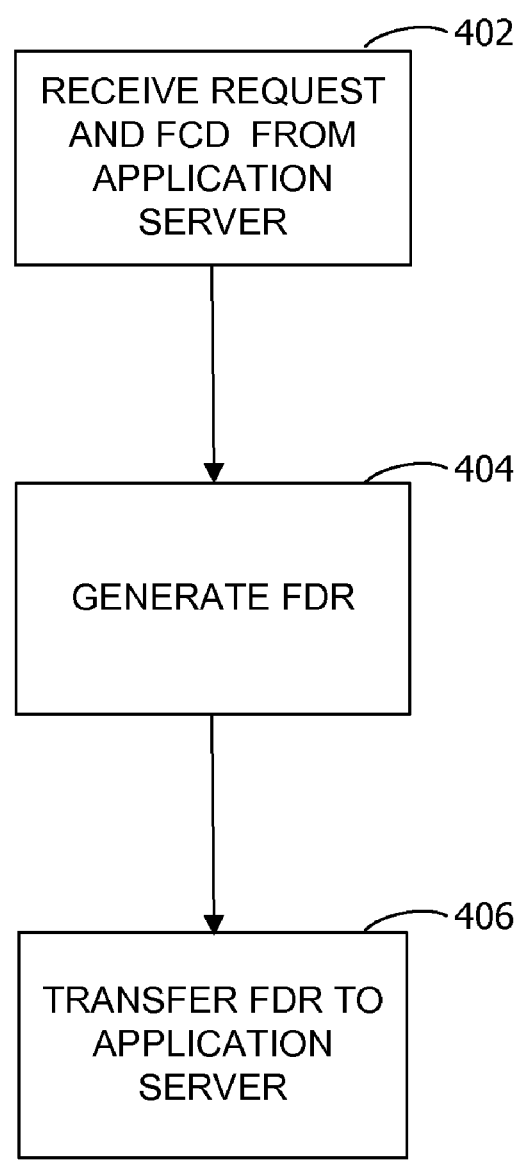
FIG. 4 is a flow diagram for generating file difference records for the recovery of application data according to an aspect of the invention.

FIG. 4 is a flow diagram for generating file difference records for the recovery of application data 106 from the last backup according to an aspect of the invention. At 402, the backup server 104 receives a request for file difference records and file change data (e.g. file change data 122) from the application server 102. The file difference record represents data modifications between backup data corresponding to a backup recovery point and the application data 106. In an embodiment, the file change data indicates the blocks of the application data 106 that have changed since the last backup. At 404, file difference records are generated as a function of the received file change data and the last backup data (e.g. backup data$_N$). The generated file difference records include modified data from the last backup data as indicated by the received file change data. At 406, the generated file difference records are transferred to the application server 102. The application server 102 applies the transferred file difference records to the application data 106, restoring the application data 106 to the state of the backup data corresponding to the backup recovery point.

Figure 5:
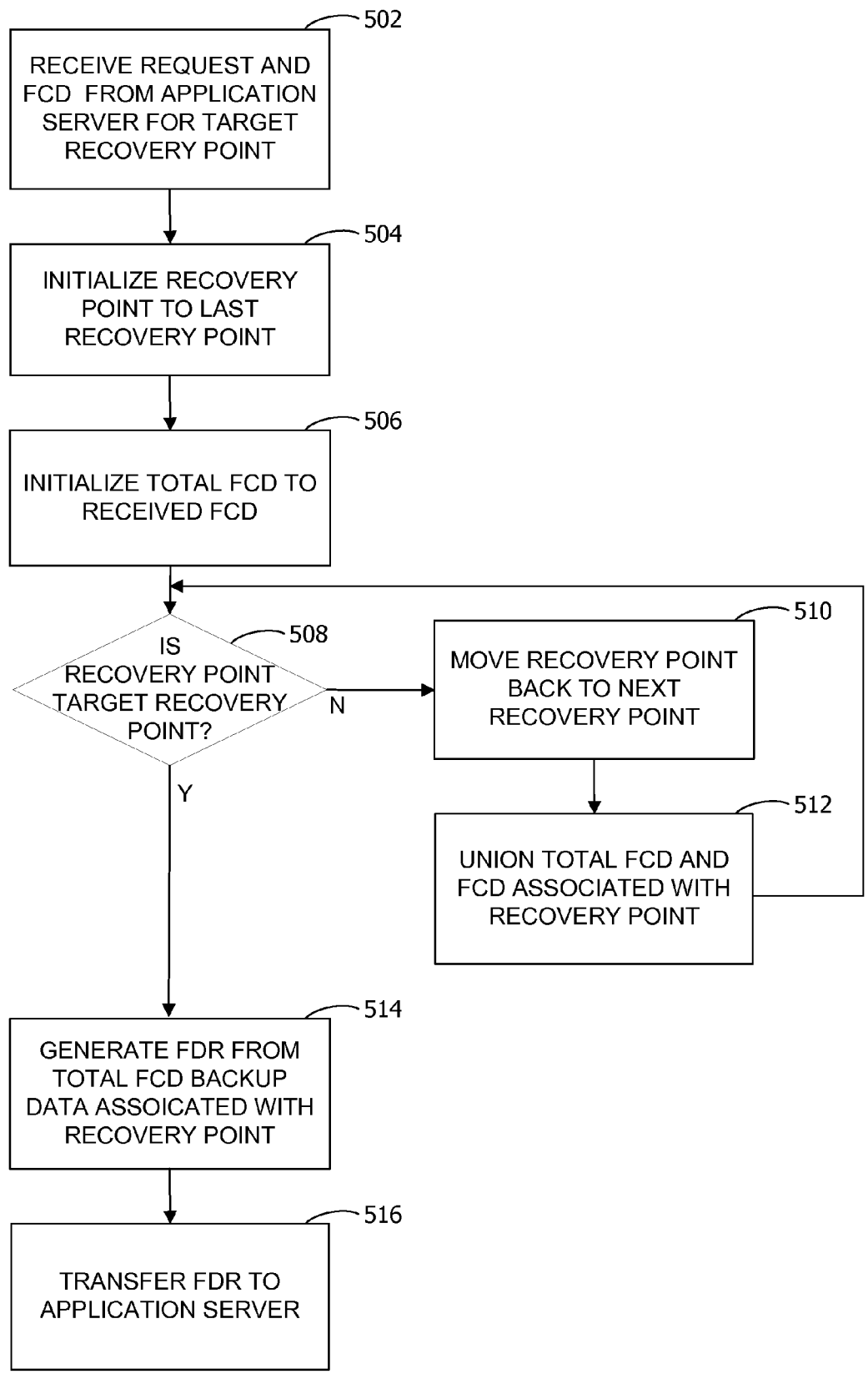
FIG. 5 is a flow diagram for generating file difference records for the recovery of application data according to another aspect of the invention.

Referring FIG. 5, at 502, the backup server 104 receives a request for file difference records associated with a target recovery point and file change data (e.g. file change data 122) from the application server 102. A recovery point corresponds to a version (or state) of the backup data (e.g. backup data$_N$, backup data$_{N-1}$, backup data$_1$). In an embodiment, the received file change data indicates the blocks of the application data 106 that have changed since the last backup. At 504, the current recovery point is initialed to the last recovery point and, at 506, the total file change data is initialized to the received file change data (e.g. file change data 122).

At 508, it is determined if the current recovery point is equal to the target recovery point. If the current recovery point is not equal to the target recovery point, at 510, the current recovery point set to the next previous recovery point. At 512, the total file change data is calculated as the total file change data unioned with the file change data (e.g. file change data$_N$) of the current recovery point. Steps 508-512 are repeated until the current recovery point is equals to the target recovery point.

If the current recovery point is equal to the target recovery point, at 514, the file difference records are generated as a function of the total file change data and the backup data associated with the target recovery point. In an embodiment, the total file change data indicates the blocks of the application data 106 that have changed since target recovery point. The generated file difference records include data for each file from the backup data associated with the target recovery point that is different from the current state of the application data 106 as indicated by the total file change data.

At 516, the generated file difference records are transferred to the application server 102. The application server 102 applies the file difference records to the application data 106 to recover the application to the target recovery point. After the file difference records have been applied to the application data 106, the state of the application data will be in the same state as the backup data at the target recovery point. Advantageously, because only the file difference records containing changes between the target recovery point and the current state of the application data, the amount of data transferred from the backup server to the application server is minimized. Thus, the bandwidth needed to transfer the data and the time needed to recover the data to the target recovery point are also minimized.

For example, suppose there are five total recovery points available on the backup server 104. The recovery points are numbered sequentially in descending order where the first recovery point corresponds to the oldest available backup and the fifth recovery point corresponds the last backup before the request. Additionally, the backup server 104 receives a request from the application server 102 indicating that the target recovery point is the third recovery point and that blocks 1, 2, 4, 10 of the application data 106 have been modified since the last backup (step 502). The current recovery point is initialed to the fifth (last) recovery point (step 504) and the total file change data is initialized to the received file change data (step 506).

At step 508, it is determined that the current recovery point (5) is not equal to the target recovery point (3). Therefore, the current recovery point is set to the next previous recovery point (4) (step 510). Also, at step 512, the file change data corresponding to the fourth recovery point (6, 10, 12) is unioned to the total file change data (1, 2, 4, 10) resulting in a total file change data of (1, 2, 4, 6, 10, 12). The file change data corresponding to the fourth recovery point indicates the changes that occurred to the application data between the fifth recovery and the fourth recovery point.

Next, the steps 508-512 are repeated for the fourth recovery point. At step 508, it is determined that the current recovery point (4) is not equal to the target recovery point (3). Therefore, the current recovery point is set to the next previous recovery point (3) (step 510). Also, at step 512 the file change data corresponding to the third recovery point (5, 7) is unioned to the total file change data (1, 2, 4, 6, 10, 12) resulting in a total file change data of (1, 2, 4, 5, 6, 7, 10, 12). The file change data corresponding to the third recovery point indicates the changes that occurred to the application data between the fourth recovery and the third recovery point.

At step 508, it is determined that the current recovery point (3) is equal to the target recovery point (3) and the loop terminates. The total file change data of (1, 2, 4, 5, 6, 7, 10, 12) contains a list of blocks that have been changed between the current state of the application data 106 and the third recovery point. Table 1 summarizes the data of this example.

TABLE 1

| Recovery Point | File change data | Total file change data |
|---|---|---|
| 5 | 1, 2, 4, 10 (from request) | 1, 2, 4, 10 |
| 4 | 6, 10, 12 | 1, 2, 4, 6, 10, 12 |
| 3 | 5, 7 | 1, 2, 4, 5, 6, 7, 10, 12 |

The file difference records are generated as a function of the total file change data (1, 2, 4, 5, 6, 7, 10, 12) such that the generated file difference records include data for each file from the backup data associated with the third recovery point that is different from the current state of the application data 106 as indicated by the total file change data. The generated file difference records are transferred to the application server 102 and applied to the application data to recover the application to the third recovery point. After the file difference records have been applied to the application data 106, the state of the application data will be in the same state as the backup data at the third recovery point.

For purposes of illustration, programs and other executable program components, such as the application program 108 and the recovery program 110 are illustrated herein as discrete blocks. It is recognized, however, that such programs and components reside at various times in different storage components of the portable application server 102, and are executed by the data processor(s) of the devices.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Embodiments of the invention may be implemented with computer-executable instructions. The computer-executable instructions may be organized into one or more computer-executable components or modules. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

When introducing elements of aspects of the invention or the embodiments thereof, the articles "a," "an," "the," and "said" are intended to mean that there are one or more of the elements. The terms "comprising," "including" and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

APPENDIX A

Experimental Results:

In order to measure the performance gains of this approach, some experiments were conducted on an email server. The experiment below assumes a corruption system failure. Below is the summary of the findings:

Size of protected data source: 200 GB
Churn rate (Logs generated): 5% per day (10 GB per day)
Frequency of full backups: once per day
Corresponding changes in database file: 30 GB
Size of full backup without optimizations: 200 GB
Size of backup: 30 GB
Percentage gain: 85%
Recovery is done after 12 hours of last full backup
Amount of logs: 5 GB
Changes to database: 15 GB
Step 1 (Backup of data source on application server)
Data transferred without proposed optimization: 200 GB
Data transferred with proposed optimizations: 15 GB
Step 2 (Recovery of data source from backup server)
Data transferred without proposed optimization: 200 GB
Data transferred with proposed optimizations: 15 GB
Step 3 (Re-protect data)
Data transferred without proposed optimization: 200 GB
Data transferred with proposed optimization: 15 GB
Overall percentage gain: 92.5%

What is claimed is:

1. A method for generating consecutive replicas at a backup server for application data located on a storage device associated with an application server, said backup server and said application server being coupled via a logical communication connection, said method comprising:

providing an application server having application data stored on a storage device;

providing an backup server;

coupling the application and backup servers via a logical communication connection;

receiving at the backup server a first replica of the application data from the application server via the logical communication connection, said application data being located on the storage device associated with the application server, said first replica being a copy of the application data stored on said storage device at a particular point in time and representing a first state of application data, said first replica being stored on the backup server;

receiving at the backup server first file change data from the application server via the logical communication connection, said first file change data indicating the blocks of a file associated with the application data that have been changed on the storage device associated with the application server since the particular point in time when the first replica of the application data was stored on the backup server;

receiving at the backup server a first file difference record from the application server via the logical communication connection, said first file difference record containing data changes between a second state of the application data located on the storage device associated with the application server and the first replica stored on the backup server; and generating, at the backup server, a second replica from the first replica and the received first file difference record by creating a second replica from the first replica data and applying the received first file difference record to the first replica data in the second replica such that said second replica is in a state corresponding the second state of the application data, wherein the first replica is preserved on the backup server; and deleting at the backup server the first file difference record, said deleting occurring after the first file difference record has been applied to the first replica to generate the second replica.

2. The method of claim 1, further comprising:

receiving second file change data from the application server, said second file change data indicating which blocks of a file associated with the application data have been changed on the storage device since the second replica of the application data;

receiving a second file difference record from the application server, said second file difference record indicating changes between a third state of the application data located on a storage device associated with an application server and the second replica on the backup server; and applying the second file difference record to the second replica to generate a third replica such that said third replica is in a state corresponding the third state of the application data.

3. The method of claim 1, wherein the determining the changed blocks of the storage device further comprises:

tracking blocks on the storage device including application data that changed since the last backup of the replica.

4. The method of claim 3, wherein the tracked blocks on the storage device associated with the application data is less than the total number of blocks on the storage device associated with the application data.

5. The method of claim 1, wherein the application data is associated with one or more of the following application programs: an email application and a database application.

6. A method for generating a file difference record at a backup server, said file difference record representing data changes between backup data stored on the backup server corresponding to a first backup recovery point and application data located on a storage device associated with an application server, said backup server and said application server being coupled via a logical communication connection, said method comprising:

receiving at the backup server a request for file difference records from the application server via the logical communication connection, wherein the request is received in response to an indication that a system failure has occurred on the application server, wherein the indication that a system failure has occurred comprises one or more of the following: the application program is completely unavailable, the application program is partially unavailable and at least part of the application data is missing, said request including file change data indicating the data blocks on the storage device associated with the application server that have been changed between the current state of the application data on the storage device associated with the application server and the backup data stored on the backup server corresponding to the first backup recovery point;

generating at the backup server the file difference record as a function of the received file change data and the backup data, wherein the file difference record includes changed data from the backup data as indicated by the received file change data; and transferring the generated file difference record to the application server from the backup server via the logical communication connection, the application server applying the file difference record to the application data to restore the application data to the state of the backup data corresponding to the first backup recovery point.

7. The method of claim 6, wherein the received file change data further comprises:

determining the checksum for each block of application data on the storage device associated with the application server;

determining the checksum for each corresponding block of backup data corresponding to the first backup recovery point at a backup server; and tracking the changed blocks of the application data as function of the determined checksums of blocks of the application data and the determined checksums of the corresponding blocks of backup data associated with the first backup recovery point.

8. The method of claim 6, wherein the file system of the storage device comprises one or more of the following: FAT (File Allocation Table), NTFS (New Technology File System), HFS (Hierarchical File System), HFS+(Hierarchical File System Plus), ext2 (second extended file system) and ext3 (third extended file system).

9. The method of claim 6, wherein the application data is associated with one or more of the following application programs: an email application and a database application.

10. A method for generating a file difference record, said file difference record representing the change between a target recovery point for backup data and application data located on a storage device associated with an application server, wherein the backup data is stored on a backup server coupled to the application server via a logical communication connection, said application data being in a state associated with a previous state of the application data, said method comprising:

receiving at the backup server a request for file difference records from the application server via the logical communication connection for a target backup recovery point, wherein the request is received in response to an indication that a system failure has occurred on the application server, wherein the indication that a system failure has occurred comprises one or more of the following: the application program is completely unavailable, the application program is partially unavailable and at least part of the application data is missing, said request including file change data indicating the blocks of files associated with the current state of the application data that have been changed on the storage device associated with the application server since a last backup recovery point, wherein the received file change data further comprises:

determining the checksum for each block of application data on the storage device associated with the application server;

determining the checksum for each corresponding block of backup data associated with the last backup recovery point on the backup server; and tracking the changed blocks of the application data on the storage device associated with the application server based on a comparison of the determined checksums of blocks of the application data and the determined checksums of the corresponding blocks of backup data associated with the last backup recovery point;

determining at the backup server additional file change data, said additional file change data indicating the blocks of files of backup data that have been changed since the last backup recovery point and the target recovery point;

generating at the backup server the file difference record as a function of the received file change data, the determined additional file change data and the backup data, the file difference record including the backup data that is different than the current state of the application data; and transferring from the backup server the generated file difference record to the application server via the logical communication connection, the application server applying the generated file difference record to the application data located on the storage device associated with the application server to restore the application data to the state of the backup data associated with the target recovery point.

11. The method of claim 10, wherein the determining the additional file change data further comprises:

unioning the file change data between all consecutive backup recovery points from the last backup of the application data to the target recovery point.

12. The method of claim 10, wherein the application data is associated with one or more of the following application programs: an email application and a database application.

13. The method of claim 10, wherein the file system of the storage device comprises one or more of the following: FAT (File Allocation Table), NTFS (New Technology File System), HFS (Hierarchical File System), HFS+(Hierarchical File System Plus), ext2 (second extended file system) and ext3 (third extended file system).

14. The method of claim 10, wherein the received file change data further comprises tracking blocks on the storage device including application data that changed since the last recovery point.

* * * * *